United States Patent
Donaldson et al.

(10) Patent No.: US 10,635,954 B2
(45) Date of Patent: Apr. 28, 2020

(54) DOT CLOCK SIGNAL GENERATION FOR OPERATING EJECTORS IN MULTIPLE COLOR STATIONS IN A SUBSTRATE PRINTER

(71) Applicant: Xerox Corporation, Norwalk, CT (US)

(72) Inventors: Patricia J. Donaldson, Pittsford, NY (US); Michael B. Monahan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/149,561

(22) Filed: Oct. 2, 2018

(65) Prior Publication Data

US 2020/0104655 A1 Apr. 2, 2020

(51) Int. Cl.
*G06K 15/12* (2006.01)
*G06K 15/02* (2006.01)
*G06F 3/12* (2006.01)
*B41J 2/21* (2006.01)
*B41J 2/045* (2006.01)

(52) U.S. Cl.
CPC ........ *G06K 15/129* (2013.01); *B41J 2/04573* (2013.01); *B41J 2/04586* (2013.01); *B41J 2/2132* (2013.01)

(58) Field of Classification Search
None
See application file for complete search history.

(56) References Cited

U.S. PATENT DOCUMENTS

| | | | |
|---|---|---|---|
| 5,160,969 A * | 11/1992 | Mizuma | G03G 15/0126 399/223 |
| 9,409,389 B1 | 8/2016 | Donaldson et al. | |
| 2001/0004284 A1 * | 6/2001 | Fukuda | G03B 27/73 355/29 |
| 2007/0103534 A1 * | 5/2007 | Shinohara | B41J 11/007 347/104 |
| 2008/0030536 A1 * | 2/2008 | Furukawa | B41J 11/007 347/16 |
| 2008/0204497 A1 * | 8/2008 | Furuhata | B41J 3/60 347/16 |
| 2010/0053250 A1 * | 3/2010 | Ito | B41J 29/38 347/16 |
| 2019/0001720 A1 * | 1/2019 | Zollner | B41J 11/008 |
| 2019/0009530 A1 * | 1/2019 | Sakuyama | B41J 2/04586 |

* cited by examiner

*Primary Examiner* — Beniyam Menberu
(74) *Attorney, Agent, or Firm* — Maginot Moore & Beck LLP

(57) ABSTRACT

A printer includes a plurality of dot clock signal generators, each of which generates dot clock signals for operating ejectors in a printhead in a color station of the printer. The dot clock signal generators are connected in a chain that corresponds to the process direction of the color stations in the printer. Each dot clock signal generator is configured to count dot clock signals of a preceding dot clock signal generator in the chain or a reference clock generator to determine when the dot clock signal generator turns on and to count encoder signals corresponding to movement of a substrate through the printer to determine when to generate dot clock signals for a color station.

24 Claims, 3 Drawing Sheets

DOT CLOCK SIGNAL GENERATION FOR OPERATING EJECTORS IN MULTIPLE COLOR STATIONS IN A SUBSTRATE PRINTER

TECHNICAL FIELD

This disclosure relates generally to substrate printers and, more particularly, to the signal generation for operating the printheads in multiple color stations in such printers.

BACKGROUND

In typical color printers, supply drawers of one or more types of substrates are provided within a housing of the printer. Substrates pulled from one of these drawers are moved by a media transport through the printer in a process direction. Data of images to be produced on the substrates are transformed into color separations having pixels and these transformed data are transferred by a printer controller into a firing signal generator for selective operation of the ejectors in a printhead. The printheads are usually organized into staggered arrays and each staggered array extends across the media transport path in a cross-process direction that is perpendicular to the process direction in the plane of the substrates being carried by the media transport. Each staggered array also corresponds to a particular color of ink. For example, a printer having four staggered arrays includes one or more printheads having an array of ejectors in each printhead that eject ink directly onto the substrates as the substrates pass the printheads. Each staggered array of printheads corresponds to a single color of ink, one for each of the colors typically used in color printing, namely, cyan, magenta, yellow, and black (CMYK).

The signals operating the ejectors must be appropriately timed with the passing substrates. As the media transport carries the substrates toward the printheads, the media substrates pass a substrate detector that generates a signal in response to each leading edge of a substrate being detected. Additionally, the printer controller receives data from encoders mounted proximately to rollers positioned along a portion of the media transport to calculate the linear velocity and position of the substrates as the substrates move past the printheads. The position calculated by the controller is used to operate signal generators known as dot clock generators. These dot clock generators produce signals that enable a firing signal generator to operate a row of ejectors with reference to the transformed image data delivered to the printheads as an appropriate area in the cross-process direction passes the row of ejectors.

In previously known color printers, the dot clock generators for the different staggered arrays, sometimes called stations, count clock signals to synchronize the generation of the dot clock signals with the arrival of the substrates opposite the stations based on the velocity calculation. A problem arises when the media transport slips or hesitates as the dot clock generators continue to count clock signals even though the substrates have briefly slowed. Thus, the dot clock generators begin to generate dot clock signals that operate the ejectors in a row slightly before the appropriate position on the substrate is positioned opposite the ejectors appropriately. Thus, pixels of one color may not land adjacent the pixels of another color to produce a proper hue of a secondary or tertiary color. Generating dot clock signals with compensation for transport slips would be beneficial.

SUMMARY

A new method for operating dot clock signal generators synchronizes transport positional data among the various dot clock signal generators to compensate for timing delays that may occur in the transport of substrates through a printer. The new dot clock signal generator includes identifying and sending with a controller values for an encoder count parameter and a dot clock count parameter to each dot clock signal generator in a plurality of dot clock signal generators, counting with a first dot clock signal generator pulses in a pulse train generated by an encoder associated with a media transport carrying substrates in the printer when a leading edge of a substrate is detected at a first position on the media transport, generating dot clock signals with the first dot clock signal generator in the plurality of dot clock signal generators when the count of pulses equals the value for the encoder count parameter received by the first dot clock signal generator from the controller, counting the dot clock signals generated by the first dot clock signal generator with a second dot clock signal generator that follows the first dot clock signal generator in a process direction, counting pulses in the pulse train with the second dot clock signal generator when the count of the dot clock signals generated by the first dot clock signal generator equals the value for the dot clock count parameter received by the second dot clock signal generator from the controller, and generating dot clock signals with the second dot clock signal generator when the count of pulses equals the value for the encoder count parameter received by the second dot clock signal generator from the controller.

A new printer includes dot clock signal generators that synchronize transport positional data among the various dot clock signal generators to compensate for timing delays that may occur in the transport of substrates through a printer. The new printer includes an encoder configured to generate a pulse train, each pulse in the pulse train being indicative that a roller associated with a media transport has rotated a predetermined distance, a substrate detector configured to generate a signal indicating a leading edge of a substrate being carried by the media transport has passed the substrate detector, a plurality of dot clock signal generators, each dot clock generator being operatively connected to a firing signal generator in a plurality of color stations of the substrate printer in a one-to-one correspondence between the plurality of dot clock signal generators and the plurality of color stations, and each dot clock signal generator being connected to one another to form a chain of dot clock signal generators in a process direction and to the encoder, a first dot clock signal generator being configured to count pulses in the encoder pulse train upon detection of the signal generated by the substrate detector and to generate dot clock signals when the count of the pulses reaches a first predetermined value and each remaining dot clock signal generator being configured to count pulses in the encoder pulse train upon detection of a predetermined number of dot clock pulses being generated by the preceding dot clock signal generator in the chain of dot clock signal generators and to generate dot clock signals when the count of the pulses reaches a second predetermined value.

BRIEF DESCRIPTION OF THE DRAWINGS

The foregoing aspects and other features of a dot clock signal generator that synchronizes transport positional data among the various dot clock signal generators to compensate for timing delays that may occur in the transport of substrates through a printer are explained in the following description, taken in connection with the accompanying drawings.

DETAILED DESCRIPTION

Figure 1:
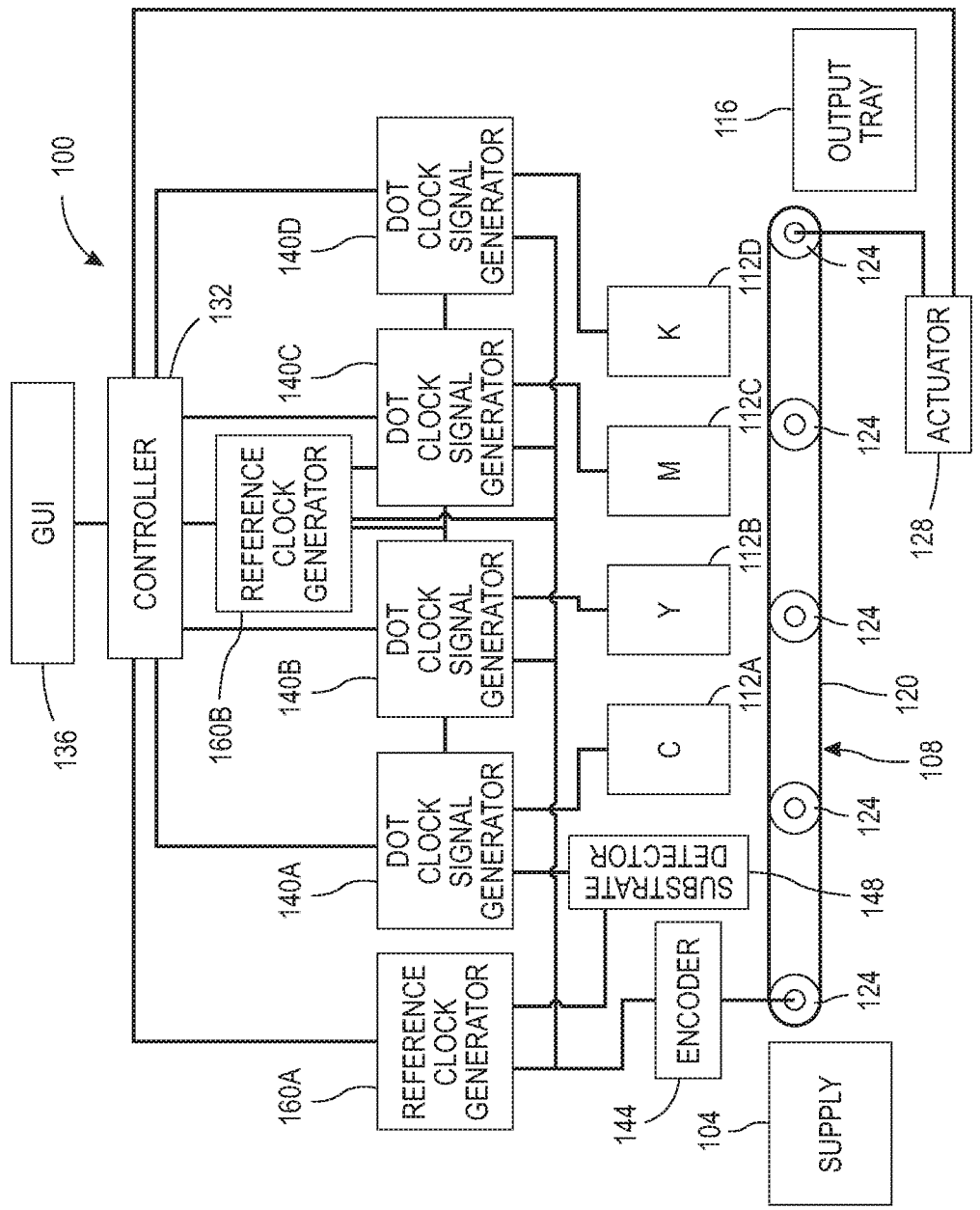
FIG. 1 depicts a color printer having dot clock signal generators that synchronize transport positional data among the various dot clock signal generators to compensate for timing delays that may occur in the transport of substrates through a printer.

For a general understanding of the environment for the device disclosed herein as well as the details for the device, reference is made to the drawings. In the drawings, like reference numerals designate like elements. As used herein, the term "process direction" refers to a direction of substrate movement through a printer. As used in this document, the term "cross process direction" refers to an axis that is perpendicular to the process direction in the plane of the substrates carried by the media transport.

FIG. 1 depicts a color printer 100 having dot clock signal generators that synchronize transport positional data among the various dot clock signal generators to compensate for timing delays that may occur in the transport of substrates through a printer. The printer 100 includes a supply of substrates 104, a media transport 108, a plurality of color stations 112A to 112D, and an output tray 116. The supply of substrates 104 includes one or more drawers configured to hold a plurality of substrates of different sizes and media types. These substrates are removed from the supply 104 and placed on the media transport 108 for movement in the process direction through the printer 100. As shown in the figure, the media transport 108 includes an endless belt 120 wrapped around a number of rollers 124 for rotation about the rollers. Two of the rollers 124 are operatively connected to actuators 128, which are operated by the controller 132, to drive the rollers 124 and rotate the belt 120 about the rollers to move the substrates on the belt through the printer. The rollers 124 not connected to actuators 128 are rotated by the mass of the belt as it moves and are known as idler rollers. Other forms of media transports, such as those having rollers that directly contact the substrates, are known and can alternatively be used in the printer 100. After the substrates are carried past the color stations 112A to 112D for the formation of images on the substrates, the substrates are delivered to the output tray 116 so they can accumulate for later retrieval.

A graphic user interface or GUI 136 is operatively connected to the controller 132 to provide signals to the controller for operation of the printer 100. For example, a user can identify a drawer in the supply 104 for a printing operation and the controller 132 can obtain data from a memory operatively connected to the controller that identifies the size and type of media in the selected drawer. As discussed more fully below, these data are used by the controller 132 to provide data to the dot clock signal generators 140A to 140D that are necessary for the synchronized operation of the generators. The dot clock generator 140A is operatively connected to the firing signal generator of the cyan color station 112A, the dot clock generator 140B is operatively connected to the firing signal generator of the yellow color station 112B, the dot clock generator 140C is operatively connected to the firing signal generator of the magenta color station 112C, and the dot clock generator 140D is operatively connected to the firing signal generator of the black color station 112D. The dot clock signals generated by the dot clock signal generators enable the firing signal generator in each of the color stations to generate the firing signals for operating a row of ejectors with the transformed image data provided by a digital front end image processor (not shown). The digital front end image processor generates pixelated color separation data for the operation of the ejectors in the printheads of the color stations 112A to 112D.

An encoder 144 is operatively connected to the lead driven roller 124. The encoder 144 is configured to generate an index signal when a reference mark on the roller passes the encoder and to generate a signal indicative that a predetermined angular displacement of the roller has occurred as the roller rotates about its longitudinal axis. These signals can be counted by the dot clock signal generators 140A to 140D to ascertain the velocity and position of the substrates carried by the media transport 108. In one embodiment, an encoder is associated with a roller that is 21.5 mm in diameter and generates a quadrature encoder signal for each 3.375 microns of roller circumference rotation. Also, a substrate detector 148 is positioned along the media transport 104 at a location that a substrate reaches prior to passing under the cyan color station 112A. This substrate detector 148 generates a signal indicating detection of a leading edge of each substrate that passes the substrate detector. This signal is provided to the dot clock signal generators 140A to 140D, which use that signal, the signal from the encoder 144, and the dot clock signals of the dot clock signal generator preceding each dot clock signal generator (except the first generator) to determine when to start each generator and when each generator begins generating dot clock signals for a color station. For the first dot clock signal generator 140A, an identified number of encoder pulses are counted to indicate when the first cross-process line of a substrate is opposite the row of ejectors in the cyan color station 112A so the dot clock signal can be delivered to the firing signal generator for this row of ejectors and these ejectors can respond to the firing signals to form the first row of cyan color on the substrate. The remaining dot clock signal generators 140B, 140C, and 140D are coupled to the dot clock signal generators 140A, 140B, and 140C, respectively. These dot clock generators count the dot clock signals generated by the dot clock signal generator preceding them in the chain of generators and the encoder signals to generate dot clock signals for the color station connected to them.

In some print runs, the distance between the substrate detector and the first color station is longer than the distance between the trailing edge of one substrate and the leading edge of the following substrate, also known as the inter-document zone. In this situation, the leading edge of the following substrate is detected by the substrate detector 148 before the first color station 112A is finished printing the preceding substrate in the process direction. To address this scenario, a reference clock generator 160A is added to the system. This reference clock generator can be implemented with a dot clock signal generator that does not send dot clock signals to a color station to cause ink to be ejected by a color station. Instead, the signal from the reference clock generator 160A is used to start the first dot clock signal generator 140A in the process direction, rather than the encoder signal, after it has finished delivering dot clock signals for the page being printed. Similarly, reference clock generator 160A may be added between the dot clock signal generator 140B and 140C to compensate for the distance between the two adjacent color stations 112B and 112C being longer than the minimum page length in the process direction plus the inter-document zone. In this case, the trailing edge of a substrate exits color station 112B while color station 112C is still printing the substrate. In FIG. 1, reference clock generator 160A is a dot clock signal generator configured to address the distance between the substrate detector 148 and the first color station 112A. When the inter-document zone is less than the distance between the substrate detector 148 and the color station 112A, the first dot clock signal generator 140A operates in the same manner as the subsequent dot clock signal generators 140B to 140D. That is, the dot clock signal generator 140A counts the dot clock signal generated by the reference clock generator 160A to determine when it is started and when it begins generating dot clock signals rather than the signal of encoder 144. In systems having subsequent color stations separated by a distance longer than the minimum page length in the process direction plus the inter-document zone, an additional reference clock generator, such as reference clock generator 160B, can be provided between the dot clock signal generators 140B and 140C as shown in FIG. 1. If this condition occurs between other adjacent color stations, another reference clock generator can be provided between the dot clock signal generators for those color stations. When this condition is detected as explained below, the dot clock signal generator 140C counts pulses from the reference clock signal generator 160B until the InitialDistance count is reached to turn on the respective dot clock signal generator and then the dot clock signal generator counts the encoder pulses to determine when to generate the dot clock signals for operating the ejectors in a color station.

Prior to commencing a printing operation, the controller 132 initializes the parameters for operating the dot clock signal generators 140A to 140D with data values that are used to count dot clock signals generated by another dot clock generator and encoder signals so the dot clock signal generators can determine when to start and when to generate dot clock signals for the color stations to which they are connected. One parameter the controller initializes is the DeviceOffset parameter. This parameter identifies a distance between the substrate detection signal and the first dot clock signal generated by each dot clock signal generator for a substrate. Each dot clock signal generator also has a parameter PreviousDotClock, which identifies the dot clock signal generator or reference clock generator monitored to determine when a particular dot clock signal generator starts. The DeviceOffset parameter values are determined a priori from manufacturing tolerances or they are empirically determined by measurements made during a setup routine for the printing system. The InitialDistance parameter specifies the distance from the starting of a particular dot clock signal generator to the first dot clock signal generated by that dot clock signal generator. When the dot clock signal generator 140A starts signal generation with reference to substrate detection, the InitialDistance parameter is set equal to the DeviceOffset value for dot clock signal generator 140A. That is, the dot clock signal generator 140A starts upon reception of the substrate detection signal and begins generating dot clock signals once the total distance indicated by the encoder signal equals the DeviceOffset value. If the value for the DeviceOffset parameter for dot clock signal generator 140A is larger than the inter-document distance, as noted above, the dot clock signal generator 140A monitors the dot clock signal from the reference dot clock generator 160A instead. The reference clock generator starts at a fixed distance from the substrate detector as determined from the encoder signal and begins generating dot clock signals at the InitialDistance from the substrate detector. This fixed distance may be zero. The dot clock signal generator 140A then counts the dot clock signal from the reference clock signal generator 160A to determine when generator 140A starts and then counts encoder signals to determine when to generate dot clock signals. For each of the remaining dot clock signal generators, the difference in the DeviceOffset parameter values for the dot clock signal generator and the preceding dot clock signal generator is calculated. The DeviceOffset is defined as the distance from the first jet of a color station to the substrate detector 144. Therefore, the difference between DeviceOffset parameter values for adjacent dot clock signal generators in the process direction is the distance from the first jet of the preceding color station to the first jet of the color station for which the difference is being calculated. Each subsequent dot clock signal generator operates in one of two modes: "off" and "on." If the dot clock signal generator is "off", i.e. not generating dot clock signals, it counts the dot clock signals delivered by the preceding dot clock signal generator to its connected color station for the substrate being printed. When the preceding dot clock signal generator has produced a number of dot clock signals corresponding to the StartDotClock parameter value for the "off" dot clock signal generator, the "off" dot clock signal generator starts and is in the "on" mode. Once the dot clock signal generator has started, it ignores dot clock signals generated by the previous dot clock signal generator and counts the encoder signals until the count equals the InitialDistance parameter value for the started dot clock signal generator. At that time, it begins to send dot clock signals to its connected color station. Once all of the dot clock signals have been delivered to the color station, the dot clock signal generator returns to the "off" state and begins monitoring the number of dot clocks delivered to the preceding color station. The DeviceOffset difference between one dot clock signal generator and its preceding dot clock signal generator is split between the StartDotClock distance, which is the number of dot clock signals delivered by the preceding dot clock signal generator multiplied by the distance between signals, and the InitialDistance, which is the distance from the start of a dot clock signal generator to the point at which it generates its first dot clock signal. The split between the StartDotClock distance and the InitialDistance can be done in many different ways, as long as the InitialDistance is less than the distance between the last dot clock signal delivered to a preceding color station and the first dot clock delivered to the next substrate. The distance over which a dot clock generator is in the "off" state may be greater or less than the physical distance between the trailing edge of one substrate and the leading edge of the next substrate. Thus, the DeviceOffset parameter value for the dot clock signal generator 140D is the sum of the DeviceOffset parameter value for dot clock signal generator 140C plus the number of StartDotClock signals generated by the dot clock signal generator 140C multiplied by the distance between dot clock signals plus the InitialDistance parameter value for the dot clock signal generator 140D.

The InitialDistance and StartDotClock parameters are adjusted to correct for delays between the start of one dot clock signal generator and the start of the next dot clock signal generator. The difference in DeviceOffsets between dot clock signal generators in the chain of dot clock signal generators and the maximum possible value for the StartDotClock parameter can be calculated at the start of the printing process. Because substrates can have different lengths in the process direction, the InitialDistance and StartDotClock values are checked and, if necessary, recalculated for each scheduled substrate. The following calculations are important:

DeviceOffsetDifference=DotClock#_DeviceOffset−DotClock(#−1)_DeviceOffset, where # is the number of a dot clock signal generator in the chain and the first dot clock signal generator encountered by a substrate in the process direction is number "1."

StartDotClockMax=floor((DeviceOffsetDifference−MinimumInterdocumentZoneLength)/DotClockSpacing). The floor function takes a real number as input and returns the greatest integer that is less than or equal to the real number. If StartDotClockMax is greater than the number of dot clock signals generated for a substrate, then StartDotClock for the dot clock signal geneator is clipped to the lastDotClock value.

InitialDistance=DeviceOffsetDifference−StartDotClock*DotClockSpacing. When a dot clock signal generator stops generating dot clock signals for a substrate, it loads the next InitialDistance value and starts counting the dot clock signals generated by the previous dot clock signal generator in the chain to see if the StartDotClock count has been reached.

A printing process is now described with reference to FIG. 2 and FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 132 noted above can be such a controller or processor. Alternatively, the controller can be implemented with more than one processor and associated circuitry and components, each of which is configured to form one or more tasks or functions described herein. Additionally, the steps of the process may be performed in any feasible chronological order, regardless of the order shown in the figures or the order in which the processing is described.

The process 300 begins with the controller identifying and sending to each dot clock generator the values for the InitialDistance and StartDotClock parameters corresponding to the first substrate to be printed (block 304). The values for these parameters are identified with reference to the data received from the GUI 136 that identifies the type and size of the media to be printed. For each dot clock signal generator and reference clock generator the next distance is set to the InitialDistance parameter value (block 308). Each dot clock signal generator and each reference clock signal generator determine whether it starts with reference to the signal from the substrate detector 148 (block 312). The controller starts the media transport, the substrate detector detects the leading edge of the first substrate and generates a substrate synchronization signal, and the first dot clock signal generator 140A or the first reference clock generator 160A, depending upon whether the IDZ situation noted above is active, determines whether the number of encoder pulses counted since the substrate synchronization signal equals the next distance parameter value (block 316). If the dot clock signal generator or reference clock generator does not start with reference to the encoder count, then it determines when the preceding dot clock signal generator or reference clock generator, depending on whether the distance between adjacent color stations relative to the substrate lengths is as noted above, is generating dot clock signals (block 320) and once it determines dot clock signals are being generated it waits until the number of dot clock signals generated by the preceding generator is equal to the StartDotClock parameter value (block 324). When the dot clock count equals the StartDotClock parameter value, then the dot clock signal generator or reference clock generator determines whether the number of encoder pulses counted since the StartDotClock value was reached equals the next distance parameter value (block 316). When it does, the generator determines whether it is a reference clock generator (block 328) and, if it is not a reference clock generator, a dot clock signal is delivered to a color station (block 332). Regardless of generator type, the dot clock count is incremented (block 336) and the dot clock count is compared to the number of dot clock signals to generate and if the last dot clock signal has been generated (block 340), then the next distance is set equal to the InitialDistance parameter value (block 308) and the process continues. If the last dot clock signal has not been generated, then the next distance is set equal to the distance to the next dot clock signal (block 344), the generator determines when the encoder count equals the next distance value (block 316), and the process continues until the last dot clock signal is generated.

Figure 2:
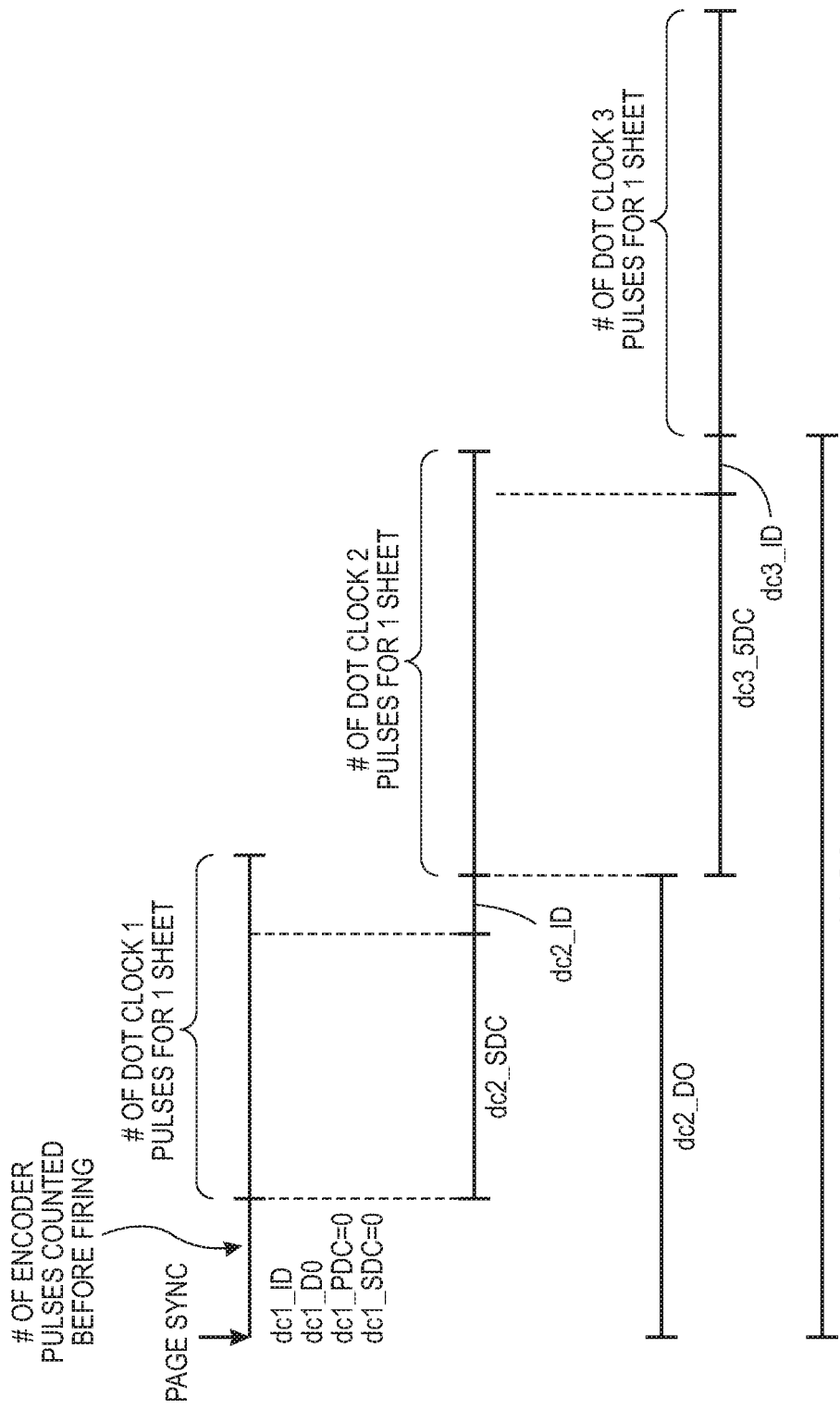
FIG. 2 is a chart depicting the relationships between the various parameters used to operate the dot clock signal generators of FIG. 1.
Figure 3:
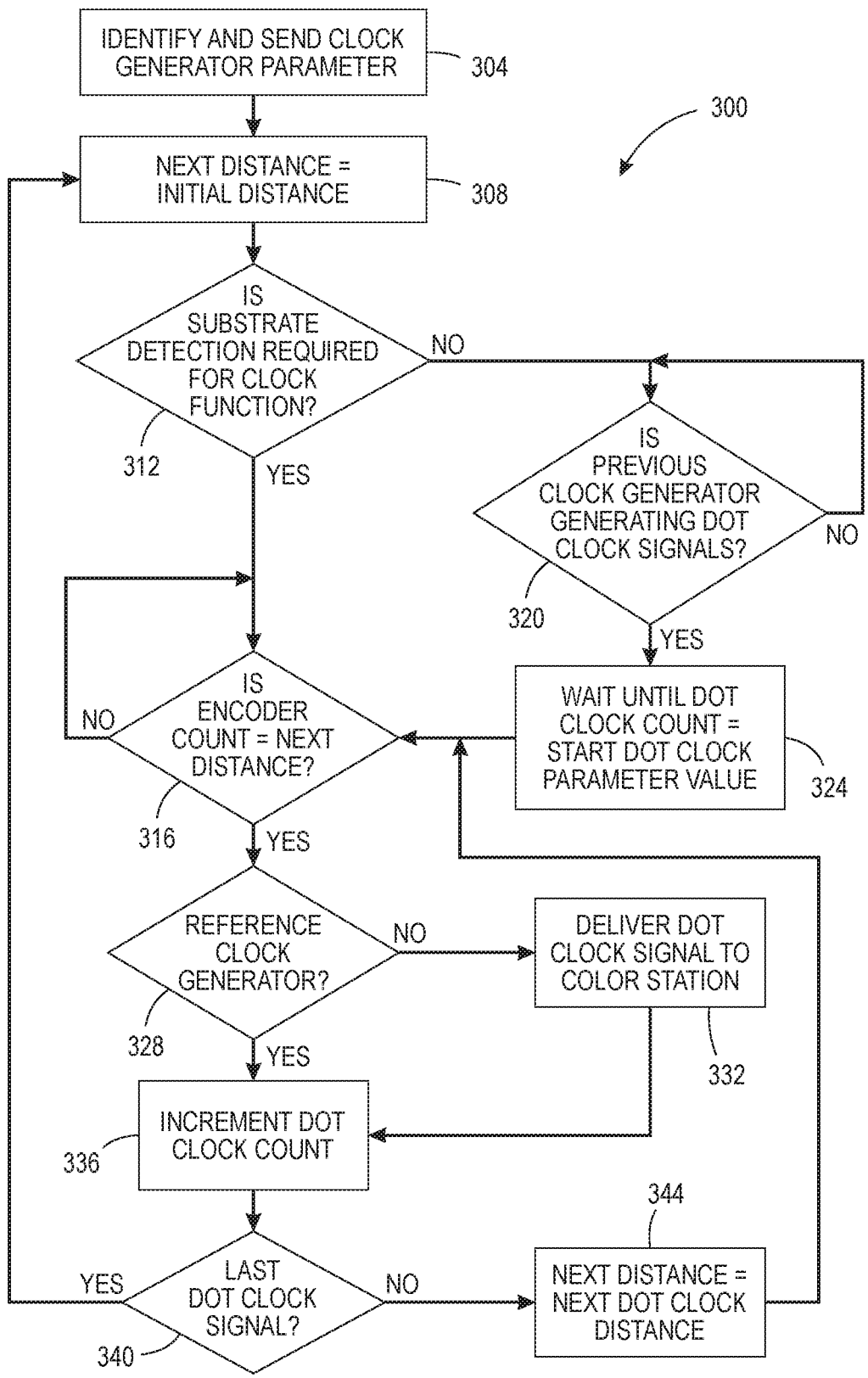
FIG. 3 is a flow diagram for a process that operates the dot clock generators of FIG. 1.

The graph of FIG. 2 depicts the process of FIG. 3 with regard to a scenario in which no reference clock generators are required. The first dot clock signal generator starts in response to the substrate synchronization signal and begins counting the encoder pulses, each of which indicates a predetermined distance has been traversed by the substrate. When the encoder pulse count reaches the value of the InitialDistance parameter, which is dc1_ID for the first dot clock signal generator, the first dot clock signal generator begins to generate dot clock signals that are delivered to the first color station and to the next dot clock signal generator in the chain. Until the last dot clock signal is generated by this dot clock signal generator, the dot clock signal generator continues to generate dot clock signals with reference to the encoder pulse train. When the last dot clock signal is generated by this dot clock signal generator, the process determines if another substrate is to be printed. If another substrate is to be printed, the controller identifies the values for the dot clock signal generator that has concluded its current dot signal generation and sends the values to that dot clock signal generator so the process can continue. Otherwise, the process stops for the dot signal generator that has concluded its current dot signal generation.

If a dot clock signal generator detects the preceding dot clock signal generator in the chain is generating dot clock signals, the dot clock signal generator counts the dot clock signals generated by the preceding dot clock signal generator. When the count of the dot clock signals reaches the StartDotClock parameter value for the counting dot clock signal generator, which is dc2_SDC for the second dot clock signal generator, the next dot clock signal generator starts and begins to count encoder pulses. This event corresponds to the leading edge of the substrate opposite the previous color station leaving that color station. When the encoder pulse count equals the value for the InitialDistance, which is dc2_ID, the second dot clock signal generator begins to generate dot clock signals that are delivered to the second color station and to the next dot clock signal generator in the chain. The next dot clock signal generator in the chain then detects the generation of dot clock signals by the preceding dot clock signal and begins counting the dot clock signals generated by the preceding dot clock signal generator. When the count of the dot clock signals reaches the StartDotClock parameter value, which is dc3_SDC for the third dot clock signal generator, the next dot clock signal generator starts and begins to count encoder pulses. This process continues until the last dot clock signal generator starts and then begins generating dot clock signals. Since no subsequent dot clock signal generator is in the chain, the last dot clock signal generator in the chain continues to generate dot clock signals with reference to the encoder pulse train until the last dot clock signal is generated. When the last signal is generated by the last dot clock signal generator in the chain, the process determines whether another substrate is being printed with reference to dot clock signals generated by other generators in the train and, if one is being so printed, then values for the dot clock parameters are identified and sent to the last dot clock signal generator in the chain. Otherwise, the process for all of the dot clock signal generators are stopped.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A substrate printer comprising:
an encoder configured to generate a pulse train, each pulse in the pulse train being indicative that a roller associated with a media transport has rotated a predetermined distance;
a substrate detector configured to generate a signal indicating a leading edge of a substrate being carried by the media transport has passed the substrate detector;
a plurality of dot clock signal generators, each dot clock generator being operatively connected to a firing signal generator in a plurality of color stations of the substrate printer in a one-to-one correspondence between the plurality of dot clock signal generators and the plurality of color stations, and each dot clock signal generator being connected to one another to form a chain of dot clock signal generators in a process direction and to the encoder, a first dot clock signal generator being configured to count pulses in the encoder pulse train upon detection of the signal generated by the substrate detector and to generate dot clock signals when the count of the pulses reaches a first predetermined value and each remaining dot clock signal generator being configured to count pulses in the encoder pulse train upon detection of a predetermined number of dot clock signals being generated by the preceding dot clock signal generator in the chain of dot clock signal generators and to generate dot clock signals when the count of the pulses reaches a second predetermined value.

2. The printer of claim 1 further comprising:
a graphic user interface (GUI) configured to receive data identifying a type and a size of media to be printed by the color stations in the printer; and
a controller operatively connected to the (GUI) and to each dot clock generator in the plurality of dot clock generators, the controller being configured to identify and send the first predetermined value to the first dot clock signal generator in the chain of dot clock signal generators and to identify and send the second predetermined value to the remaining dot clock signal generators, the controller identifying the first predetermined value and the second predetermined value using the data received by GUI.

3. The printer of claim 2, the controller being further configured to identify and send to the remaining dot clock signal generators the predetermined number of dot clock signals generated by the preceding dot clock signal generator that is used to enable counting of the encoder pulses by the remaining dot clock signal generators.

4. The printer of claim 3, the controller being further configured to calculate a velocity of a substrate on the media transport using the pulse train received from the encoder.

5. The printer of claim 4, the controller being further configured to identify and send the first predetermined value and the second predetermined value using the calculated velocity of the substrate.

6. The printer of claim 5, each dot clock signal generator being further configured to generate dot clock signals using the pulse train received from the encoder.

7. The printer of claim 6, the controller being further configured to identify the predetermined number of dot clock signals generated by the preceding dot clock signal generator as corresponding to a leading edge of the substrate exiting a color station that precedes the dot clock signal generator receiving the predetermined number of dot clock signals generated by the preceding dot clock signal generator from the controller.

8. The printer of claim 2 further comprising:
a first reference clock generator that is connected to the substrate detector and the first dot clock signal generator, the first reference clock generator being configured to generate dot clock signals when the first reference clock generator has counted a first predetermined number of encoder pulses since the substrate detector generated a signal indicative of a substrate being detected; and
the first dot clock signal generator counts a second predetermined number of dot clock signals generated by the first reference clock generator and then counts a third predetermined number of encoder pulses to commence generation of dot clock signals when an interdocument zone between substrates is less than a distance between substrate detector and a first color station in the process direction.

9. The printer of claim 8 wherein the first predetermined number is zero.

10. The printer of claim 9, the controller being further configured to:
generate a signal to the first dot clock generator to count the second predetermined number of dot clock signals generated by first reference clock generator rather than counting the predetermined number of encoder pulses following the substrate detector generating a signal indicative of detection of a substrate when the media size data received from the GUI indicates the interdocument zone between substrates is less than the distance between the substrate detector and the first color station.

11. The printer of claim 2 further comprising:
a reference clock generator, the reference clock generator having an input operatively connected to the encoder and an output operatively connected to one of the dot clock signal generators other than the first dot clock signal generator in the process direction, the reference clock generator being configured to generate dot clock signals when the reference clock generator has counted a first predetermined number of dot clock signals generated by the dot clock signal generator preceding the reference clock generator and then counts a second predetermined number of encoder pulses before commencing dot clock signal generation; and the dot clock signal generator receiving the dot clock signals from the output of the reference clock generator counts a third predetermined number of dot clock signals generated by the reference clock generator and then counts a fourth predetermined number of encoder pulses to commence generation of dot clock signals for delivery to a first color station when a distance between the first color station and a second color station that is operatively connected to an output of the dot clock signal generator preceding the reference clock generator is greater than a minimum substrate length in the process direction plus an inter-document zone between substrates.

12. The printer of claim 11, the controller being further configured to:

generate a signal to the dot clock generator operatively connected to the output of the reference clock generator to count the third predetermined number of dot clock signals generated by the reference clock generator rather than counting the predetermined number of dot clock signals generated by the dot clock signal generator operatively connected to the second color station when the media size data received from the GUI indicates the distance between the first and the second color stations is greater than a minimum substrate length in the process direction plus an inter-document zone between substrates.

13. A method of operating a printer comprising:

identifying and sending with a controller values for an encoder count parameter and a dot clock count parameter to each dot clock signal generator in a plurality of dot clock signal generators;

counting with a first dot clock signal generator pulses in a pulse train generated by an encoder associated with a media transport carrying substrates in the printer when a leading edge of a substrate is detected at a first position on the media transport by a substrate detector;

generating dot clock signals with the first dot clock signal generator in the plurality of dot clock signal generators when the count of pulses equals the value for the encoder count parameter received by the first dot clock signal generator from the controller;

counting the dot clock signals generated by the first dot clock signal generator with a second dot clock signal generator that follows the first dot clock signal generator in a process direction;

counting pulses in the pulse train with the second dot clock signal generator when the count of the dot clock signals generated by the first dot clock signal generator equals the value for the dot clock count parameter received by the second dot clock signal generator from the controller; and generating dot clock signals with the second dot clock signal generator when the count of pulses equals the value for the encoder count parameter received by the second dot clock signal generator from the controller.

14. The method of claim 13 further comprising:

receiving with the controller data from a graphic user interface (GUI) that identifies a type and a size of media to be printed by the color stations in the printer; and identifying and sending with the controller a first predetermined value to the first dot clock signal generator in the chain of dot clock signal generators using the data received from the GUI; and identifying and sending with the controller a second predetermined value to the remaining dot clock signal generators using the data received from the GUI.

15. The method of claim 14 further comprising:

identifying and sending with the controller to the remaining dot clock signal generators a predetermined number of dot clock signals generated by the preceding dot clock signal generator that is used to enable counting of the encoder pulses by the remaining dot clock signal generators.

16. The method of claim 15 further comprising:

calculating with the controller a velocity of a substrate on the media transport using the pulse train received from the encoder.

17. The method of claim 16 further comprising:

identifying and sending with the controller the first predetermined value and the second predetermined value using the calculated velocity of the substrate.

18. The method of claim 17 further comprising:

generating with each dot clock signal generator dot clock signals using the pulse train received from the encoder.

19. The method of claim 18 further comprising:

identifying the predetermined number of dot clock signals generated by the preceding dot clock signal generator as corresponding to a leading edge of the substrate exiting a color station that precedes the dot clock signal generator receiving the predetermined number of dot clock signals generated by the preceding dot clock signal generator from the controller.

20. The method of claim 14 further comprising:

generating with a reference clock generator dot clock signals when the reference clock generator has counted a first predetermined number of dot clock signals generated by a preceding dot clock signal generator operatively connected to a first color station and then counts a second predetermined number of encoder pulses before commencing generation of dot clock signals;

counting with a dot clock signal generator operatively connected to the reference clock generator and to a second color station that is adjacent to the first color station in the process direction a third predetermined number of dot clock signals generated by the reference clock generator; and counting with the dot clock signal generator operatively connected to the second color station a fourth predetermined number of encoder pulses to commence generation of dot clock signals when a distance between the first color station and the second color station is greater than a minimum substrate length in the process direction plus an inter-document zone between substrates.

21. The method of claim 20 further comprising:

generating a signal with a controller to the dot clock signal generator operatively connected to the second color station to count the third predetermined number of dot clock signals generated by reference clock generator rather than counting the dot clock signals generated by the dot clock signal generator operatively connected to the first color station when the media size data received from the GUI indicates the distance between the first and second color stations is greater than a minimum substrate length in the process direction plus an inter-document zone between substrates.

22. The method of claim 13 further comprising:

generating dot clock signals with a first reference clock generator that is connected to the substrate detector and the first dot clock signal generator when the first reference clock generator has counted a first predetermined number of encoder pulses since the substrate detector generated a signal indicative of a substrate being detected; and counting with the first dot clock generator a second predetermined number of dot clock signals generated by the first reference clock generator and then counting with the first dot clock signal generator a third predetermined number of encoder pulses to commence generation of dot clock signals when an inter-document zone between substrates is less than a distance between color stations.

23. The method of claim 22 wherein the first predetermined number is zero.

24. The method of claim 22 further comprising:

generating and sending with the controller a signal to the first dot clock generator to count the second predetermined number of dot clock signals generated by first reference clock generator rather than counting the predetermined number of encoder pulses following the substrate detector generating a signal indicative of detection of a substrate when the media size data received from the GUI indicates the inter-document zone between substrates is less than the distance between the substrate detector and a first color station.

* * * * *